United States Patent
Lee et al.

(10) Patent No.: US 8,057,088 B2
(45) Date of Patent: Nov. 15, 2011

(54) BACKLIGHT UNIT AND LIQUID CRYSTAL DISPLAY DEVICE INCLUDING THE SAME

(75) Inventors: Sun-Hee Lee, Incheon (KR); Seung-Hoon Yang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 286 days.

(21) Appl. No.: 12/318,296

(22) Filed: Dec. 24, 2008

(65) Prior Publication Data

US 2010/0053503 A1    Mar. 4, 2010

(30) Foreign Application Priority Data

Sep. 4, 2008  (KR) .................. 10-2008-0087341
Dec. 9, 2008  (KR) .................. 10-2008-0124784

(51) Int. Cl.
*F21V 7/04* (2006.01)
*G02F 1/1335* (2006.01)

(52) U.S. Cl. ..................... 362/626; 349/62; 362/623

(58) Field of Classification Search ............. 349/62, 349/65; 362/619–620, 623, 626
See application file for complete search history.

(56) References Cited

U.S. PATENT DOCUMENTS

2004/0145915 A1* 7/2004 Kim et al. ............ 362/559
2009/0122229 A1* 5/2009 Kim et al. ............ 349/65

FOREIGN PATENT DOCUMENTS

CN  1412609 A  4/2003
CN  1421729 A  6/2003

\* cited by examiner

*Primary Examiner* — Nathanael R Briggs
(74) *Attorney, Agent, or Firm* — Morgan, Lewis & Bockius LLP

(57) ABSTRACT

A backlight unit for a liquid crystal display panel includes a lamp, a plurality of optical sheets, a light guide that guides light from the lamp toward the optical sheets, and a reflector facing a rear surface of the light guide. The light guide includes a first plurality of geometric shapes at the rear surface thereof that substantially directs the light incident on the light guide toward the optical sheets, and a second plurality of geometric shapes at a peripheral portion of the rear surface thereof to prevent the reflector from sticking to the light guide, a density of the second plurality of geometric shapes is less than the density of the first plurality of geometric shapes.

18 Claims, 5 Drawing Sheets

BACKLIGHT UNIT AND LIQUID CRYSTAL DISPLAY DEVICE INCLUDING THE SAME

The invention claims the benefit of Korean Patent Application Nos. 10-2008-0087341 and 10-2008-0124784, filed in Korea on Sep. 4, 2008, and, Dec. 9, 2008, respectively, each of which is hereby incorporated by reference in its entirety.

BACKGROUND OF THE INVENTION

1. Field of the Invention

The invention relates to a liquid crystal display device, and more particularly, to a backlight unit for a liquid crystal display device.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. The induced electric field changes the alignment of the liquid crystal in the direction of, and according to the intensity of the induced electric field, thereby changing the light transmissivity of the LCD device. Thus, the LCD device displays images by varying the intensity of the induced electric field.

The LCD devices need a backlight unit to supply light. The backlight unit is categorized into an edge type and a direct type. The edge type backlight unit includes a light source located at a side of the LCD device. The direct type backlight unit includes a light source located at the bottom of the LCD device.

FIG. 1 is a perspective view of an edge type backlight unit according to the related art. Referring to FIG. 1, the edge type backlight unit 20 includes a light guide plate 30, a lamp 24 as a light source, a reflector 22 below the light guide plate 30, and a plurality of optical sheets 29 on the light guide plate 30. The optical sheets 29 include a diffusion sheet and at least one condensing sheet. A pattern at a bottom surface of the light guide plate 30 provides a uniform plane of light.

Since the light guide plate 30 and the reflector 22 are adjacent to each other, the light guide plate 30 may stick tightly to the reflector 22 due to static electricity produced at opposing surfaces of the light guide plate 30 and the reflector 22. The backlight unit 20 produces heat during operation, and the heat expands the light guide plate 30 and the reflector 22. However, the light guide plate 30 and the reflector 22 have different thermal expansion rates, and the reflector 22 is thinner than the light guide plate 30. Accordingly, the heat expansion may cause the reflector 22 to wrinkle. A luminance in a display region of the LCD device corresponding to the wrinkled region of the reflector 22 may be different from the luminance in another display region. Accordingly, such variations in luminance across the LCD device may cause defects, such as stains, on the display screen of the LCD device, and display quality is thus degraded.

SUMMARY OF THE INVENTION

Accordingly, the invention is directed to a liquid crystal display device that substantially obviates one or more of the problems due to limitations and disadvantages of the related art.

An object of the invention is to improve a display quality of a liquid crystal display device.

Another object of the invention is to provide a backlight unit having a uniform luminance for an LCD device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a backlight unit for a liquid crystal display panel includes a lamp, a plurality of optical sheets, a light guide that guides light from the lamp toward the optical sheets, and a reflector facing a rear surface of the light guide. The light guide includes a first plurality of geometric shapes at the rear surface thereof that substantially directs the light incident on the light guide toward the optical sheets, and a second plurality of geometric shapes at a peripheral portion of the rear surface thereof to prevent the reflector from sticking to the light guide, a density of the second plurality of geometric shapes is less than the density of the first plurality of geometric shapes.

In another aspect, a backlight unit for a liquid crystal display panel includes a lamp, a plurality of optical sheets, a light guide that guides light from the lamp toward a rear surface of the optical sheets, and a reflector facing a rear surface of the light guide. The light guide includes a first plurality of geometric shapes at the rear surface thereof that substantially directs the light incident on the light guide toward the optical sheets, and a second plurality of geometric shapes at a peripheral portion of the rear surface thereof, an area of the second plurality of geometric shapes is equal to or less than about 10% of the area of the peripheral portion of the rear surface of the light guide.

In another aspect, a method is provided for controlling a propagation of light in a backlight unit for a liquid crystal display panel, the backlight unit having a lamp, a plurality of optical sheets, a light guide that guides light from the lamp toward the optical sheets, and a reflector facing a rear surface of the light guide. The method includes providing a first plurality of geometric shapes at a rear surface of the light guide to substantially direct the light incident on the light guide toward the rear surface of the optical sheet; and providing a second plurality of geometric shapes at a peripheral portion of the rear surface of the light guide to prevent the reflector from sticking to the light guide, the geometric shapes in the second plurality larger than the geometric shapes in the first plurality.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1:
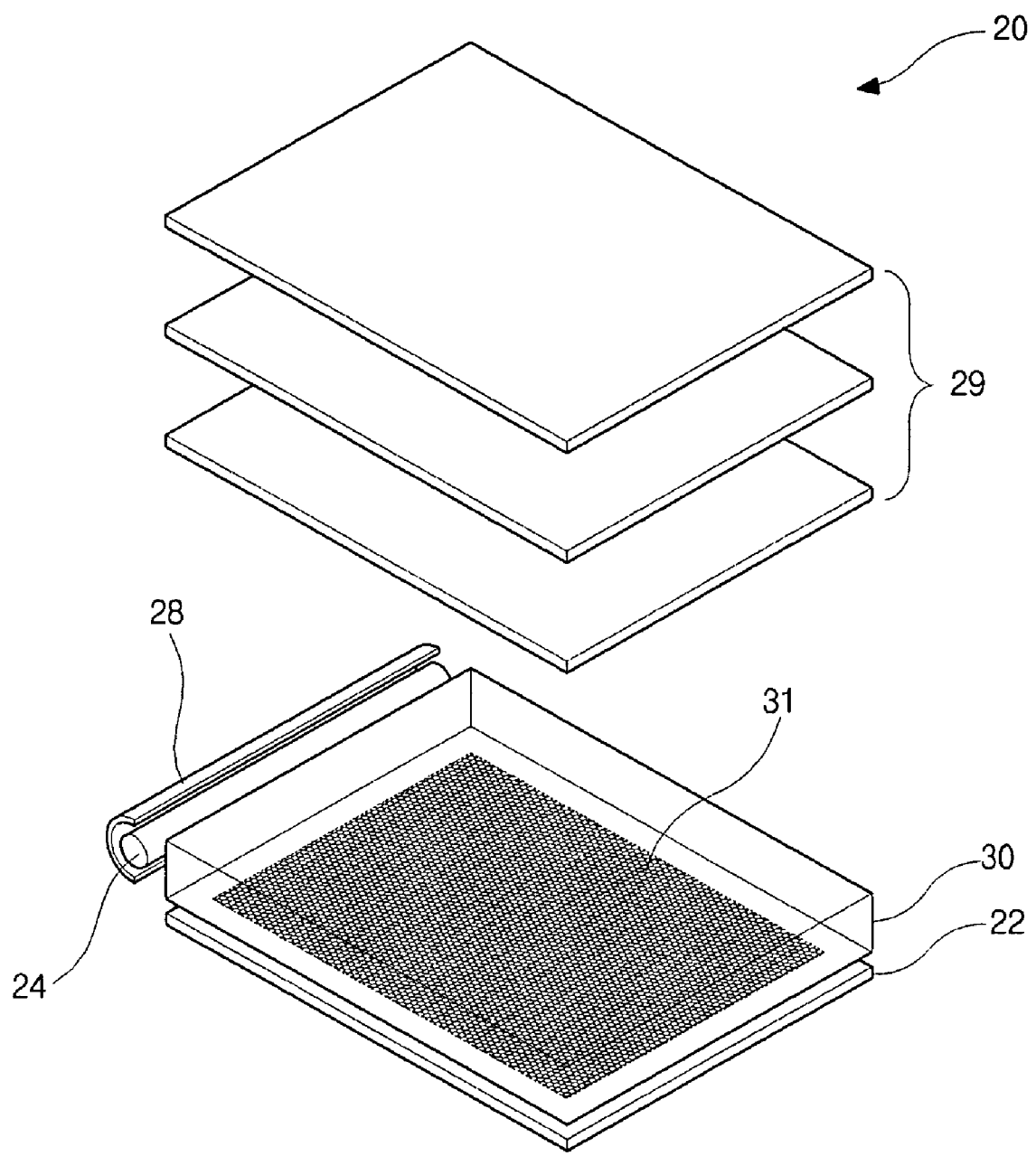
FIG. 1 is a perspective view of an edge type backlight unit according to the related art.
Figure 2:
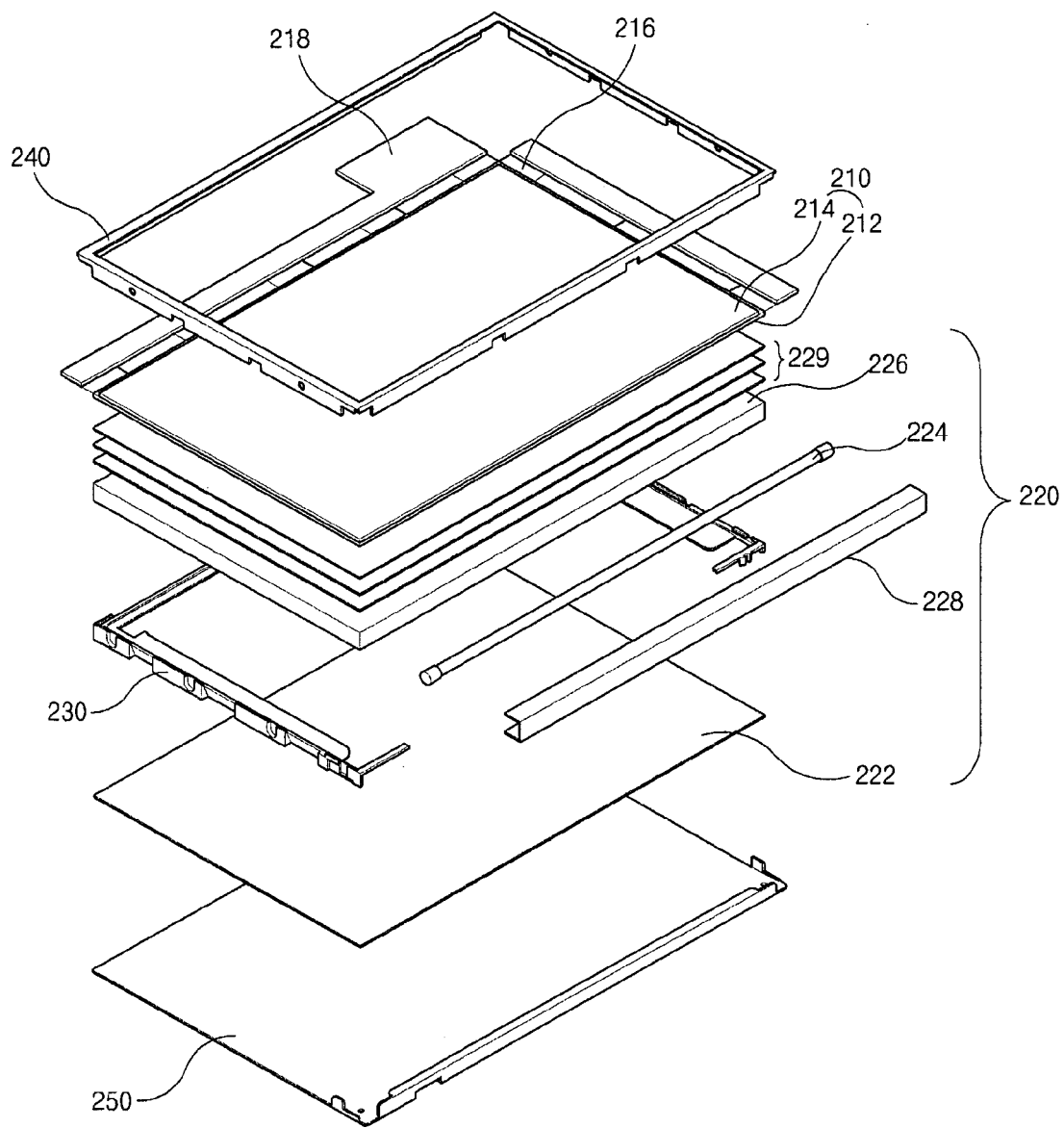
FIG. 2 is a perspective view of an exemplary LCD device according to an embodiment of the invention.

FIG. 2 is a perspective view of an exemplary LCD device according to an embodiment of the invention. Referring to FIG. 2, the LCD device includes a liquid crystal panel 210, a backlight unit 220, a main supporter 230, a bottom case 250 and a top case 240.

The backlight unit 220 includes a reflector 222 on the bottom case 250, a light guide plate 226 on the reflector 222, a lamp 224 at a side of the light guide plate 226, and a plurality of optical sheets 229 on the light guide plate 226. Light emitted from the lamp 224 is incident on an entering portion of the light guide plate 226, travels and is totally reflected in the light guide plate 226, and is distributed evenly at a front surface of the light guide plate 226. Accordingly, the light guide plate 226 supplies a plane of light toward the liquid crystal panel 210. A pattern at a bottom surface of the light guide plate 226 produces a more uniform plane of light.

The reflector 222 reflects light back to the light guide plate 226 and increases luminance. The optical sheets 229 may include a diffusion sheet and at least one condensing sheet. Accordingly, the optical sheets 229 diffuse and condense the light passing through the light guide plate 226 and supply more uniform plane of light to the liquid crystal panel 210.

The main supporter 230 has a rectangular frame shape and is coupled with the top case 240 and the bottom case 250 to accommodate the liquid crystal panel 210 and the backlight unit 220 therein. The top case 240 has a rectangular frame shape and covers peripheral portions of the liquid crystal panel 210. The bottom case 250 covers and supports the backlight unit 220 at a bottom of the LCD device.

The liquid crystal panel 210 displays images and includes first and second substrates 212 and 214 and a liquid crystal layer between the first and second substrates 212 and 214. In the first substrate 212, a plurality of gate lines and a plurality of data lines (not shown) cross each other to define a plurality of pixel regions. In each pixel region, a thin film transistor is formed and connected to the corresponding gate and data lines, and a pixel electrode is connected to the thin film transistor. In the second substrate 214, red, green and blue color filter patterns are formed in the respective pixel regions, and a black matrix is formed corresponding to the gate and data lines and the thin film transistor. Moreover, first and second alignment layers may be on inner surfaces of the first and second substrates 212 and 214, respectively. Further, a seal pattern may be provided at and along peripheral portions of the first and second substrates 212 and 214 to attach the first and second substrates 212 and 214. Further, first and second polarizing plates are attached on outer surfaces of the first and second substrates 212 and 214, respectively.

At least one driving PCB (printed circuit boards) 218 may be connected to the liquid crystal panel 210 through a connection portion 216, for example, a flexible circuit board or TCP (tape carrier package). In an assembling process, the connection portion 216 is bent and the PCB 218 is placed on a side of the main supporter 230 or a bottom of the bottom case 250.

Figure 3:
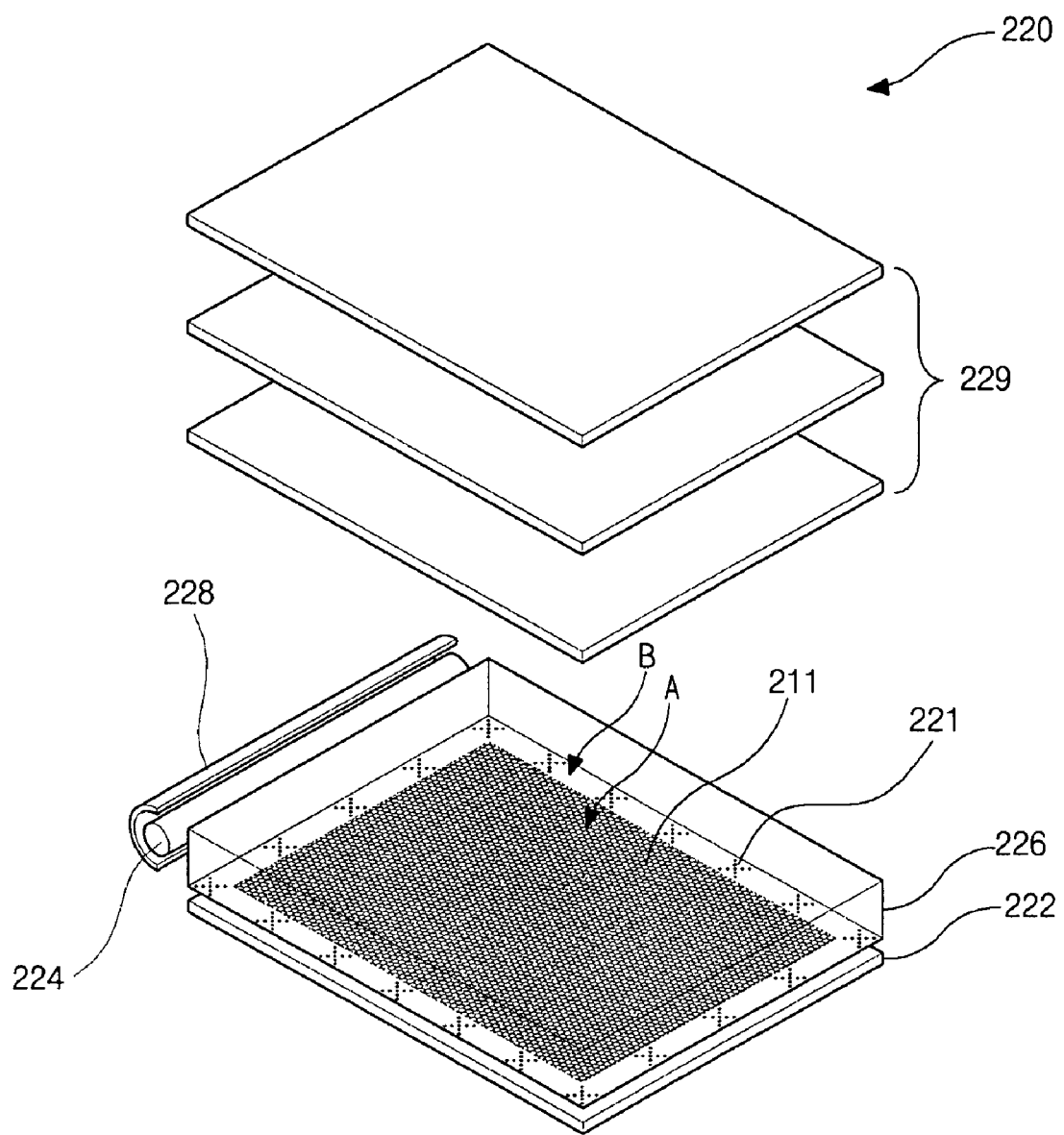
FIG. 3 is a perspective view of an exemplary backlight unit for the LCD device of FIG. 2.

FIG. 3 is a perspective view of an exemplary backlight unit for the LCD device of FIG. 2. Referring to FIG. 3, the backlight unit 220 includes a reflector 222 facing the bottom case 250 (shown in FIG. 2), a light guide plate 226 on the reflector 222, a lamp 224 facing a side of the light guide plate 226, and a plurality of optical sheets 229 on the light guide plate 226. The backlight unit 220 further includes a lamp guide 228. The lamp guide 228 support the lamp 224 and has an open portion facing the light guide plate 226 and surrounds and protects the lamp 224 and reflects light toward the edge of the light guide plate 226.

The light guide plate 226 provides a plane of light to the liquid crystal panel 210 by total reflection of light from the lamp 224. In addition, the light guide plate 226 may include a predetermined pattern to improve uniformity of the plane of light. The light guide plate 226 may be made of a plastic material, such as polymethylmethacrylate (PMMA) or an acrylic resin or a polycarbonate (PC) material.

The lamp 224 may be one of a cold cathode fluorescent lamp (CCFL) and an external electrode fluorescent lamp (EEFL). Alternatively, light emitting diodes (LEDs) may be provided as light sources along the side of the light guide plate 226. The lamp guide 228 is not required when LEDs are used as light sources.

Figure 4:
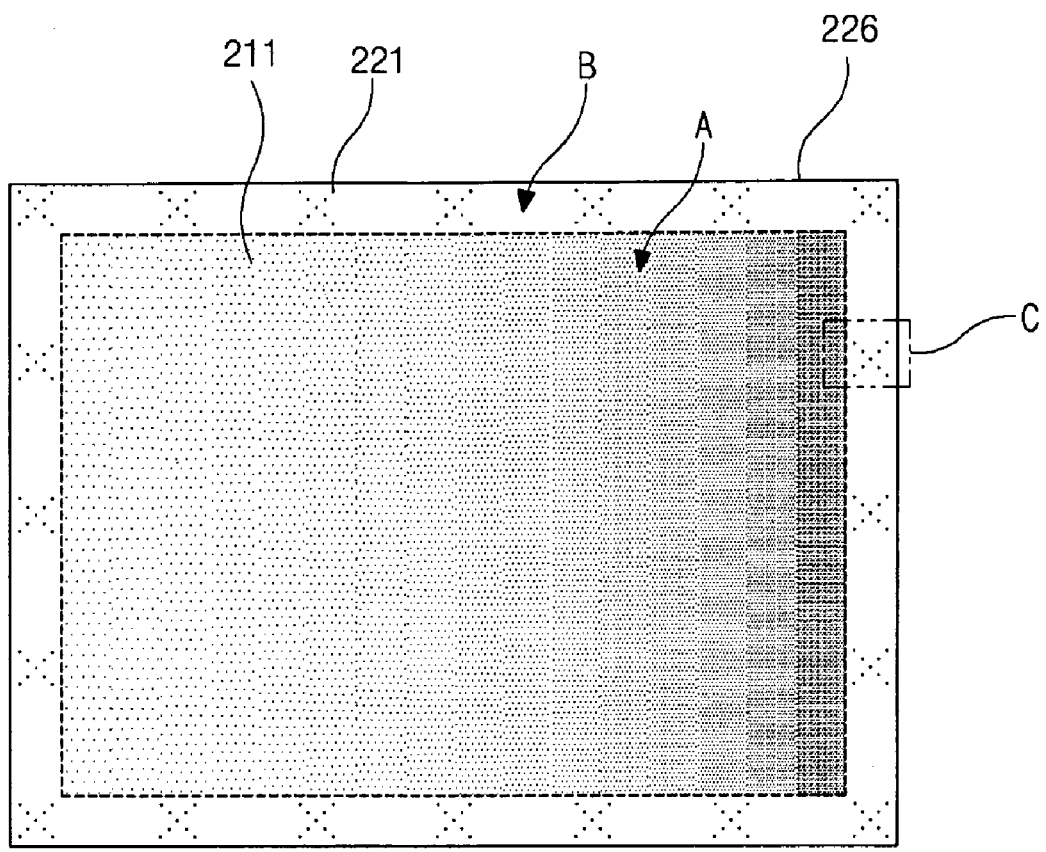
FIG. 4 is a plan view of an exemplary light guide plate for a backlight unit according to an embodiment of the invention.

FIG. 4 is a plan view of an exemplary light guide plate for a backlight unit according to an embodiment of the invention. Referring to FIG. 4, the bottom surface of the light guide plate 226 includes a first region A, and a second region B at peripheral portions of the bottom surface and surrounding the first region A. The second region B may have a width, for example, a distance between an outline of the first region A and an outline of the light guide plate 226, in a range of about 0.5 mm to 5 mm.

A first pattern of geometric features or shapes 211 is formed in the first region A at the bottom of the light guide plate 226 and a second pattern of geometric features or shapes 221 is formed in the second region B at the bottom of the light guide plate 226. Each of features or shapes 211 and 221 in the first and second patterns may have one of an elliptical shape, a polygonal shape, and a circular shape, for example. Each of the first and second patterns of geometric features or shapes 211 and 221 may be a hologram pattern, for example. The first and second patterns of geometric features or shapes 211 and 221 may be formed using a printing method or an injection molding method.

The first and second patterns of geometric features 211 and 221 may be integrally formed with the light guide plate 226. In an embodiment, the geometric features 211 and 221 in the first and second patterns may be of the same material as the light guide plate 226. In another embodiment, the geometric features 211 and 221 in the first and second patterns may be of a different material from the light guide plate 226.

In an embodiment, a diffusor (not shown) may be provided between the reflector 222 and the light guide plate 226.

The first pattern of geometric features 211 disperses light to guide light incident on the light guide plate 226. The light incident on the light guide plate 226 travels through and is totally reflected in the light guide plate 226 due to the first pattern of geometric features 211. Thus, a uniform plane of light is produced and supplied to the liquid crystal panel 210. The geometric features 211 in the first pattern have a large size and/or the pattern of geometric features 211 is dense enough to transmit most of the light incident on the light guide plate 226 to the liquid crystal panel 210. In an embodiment, the density of the first pattern of geometric features 211 may be varied according to a distance of the geometric features 211 from the lamp 224 of FIG. 3 to the first pattern of geometric features 211 to control reflection path of light incident on the light guide plate 226. For example, the density may increase as the distance of the geometric features 211 from the lamp 224 increases. Accordingly, a density of the first pattern of geometric features 211 closer the lamp 224 is less than a density of the first pattern of geometric features 211 further from the lamp 224.

The size of each of the first and second geometric features is in a range of about 50 μm to 200 μm. The size of the first and second geometric features may depend on the size, for example the diagonal size, of the liquid crystal display panel. The distance between the geometric features 211 in the first pattern decreases with the distance of the geometric features 211 to the lamp 224.

The second pattern of geometric features 221 in the second region B prevents the light guide plate 226 from being stuck to the reflector 222 due to a static electricity. The geometric features 221 in the second pattern may have a size greater than or equal to the size of the geometric features 211 in the first pattern. Moreover, the density of the second pattern of geometric features 221 may be less than the density of the first pattern of geometric features 211. In an embodiment, the density of the second pattern of geometric features 221 is less than the lowest density of the first pattern of geometric features 211 which is closest to the lamp 224. The second pattern of geometric features 221 prevents a bright line caused by reflection of light, which is incident on the second region B, at up and down edges of the light guide plate 226. In contrast with the first pattern of geometric features 211, the second pattern of geometric features 221 does not disperse light incident on the light guide plate 226. Moreover, the second pattern of geometric features 221 prevents the light guide plate 226 and the reflector 222 from sticking to each other due to the static electricity.

A distance between the adjacent geometric features 221 in the second pattern may be several hundreds μm, and an area of the second pattern of geometric features 221 may be equal to or less than about 10% of the area of the second region B. For example, the distance between the adjacent geometric features 221 ranges from about 250 μm to about 900 μm. When the density of the second pattern of geometric features is less than 10% of the second region B, the effect on the light is marginal. For example, when the density of the second pattern of geometric features is about 5% of the second region, no noticeable effect on the light is observed.

In an embodiment, the pattern size is about 50 μm and the distance between the adjacent geometric features 211 in the first pattern can be as large as about 140 μm when the geometric features 211 are closer to the lamp. The pattern size can about 50 μm and the distance between the adjacent geometric features 211 in the first pattern can be as small as about 5 μm when the geometric features 211 are further from the lamp.

Since the light guide plate 226 is prevented from being stuck to the reflector 222 due to the second patterns 221, even when the backlight unit 220 produces heat in operation, the reflector 222 can be prevented from being wrinkled due to the difference in thermal expansion rate with light guide plate 226. Therefore, the luminance difference in the display screen due to the wrinkling can be prevented, and display quality can thus be improved.

The second pattern of geometric features 221 can be formed together with the first pattern of geometric features 211 using a printing method or injection molding method. Accordingly, an additional process for forming the second pattern of geometric features 221 is not required.

Figure 5A:
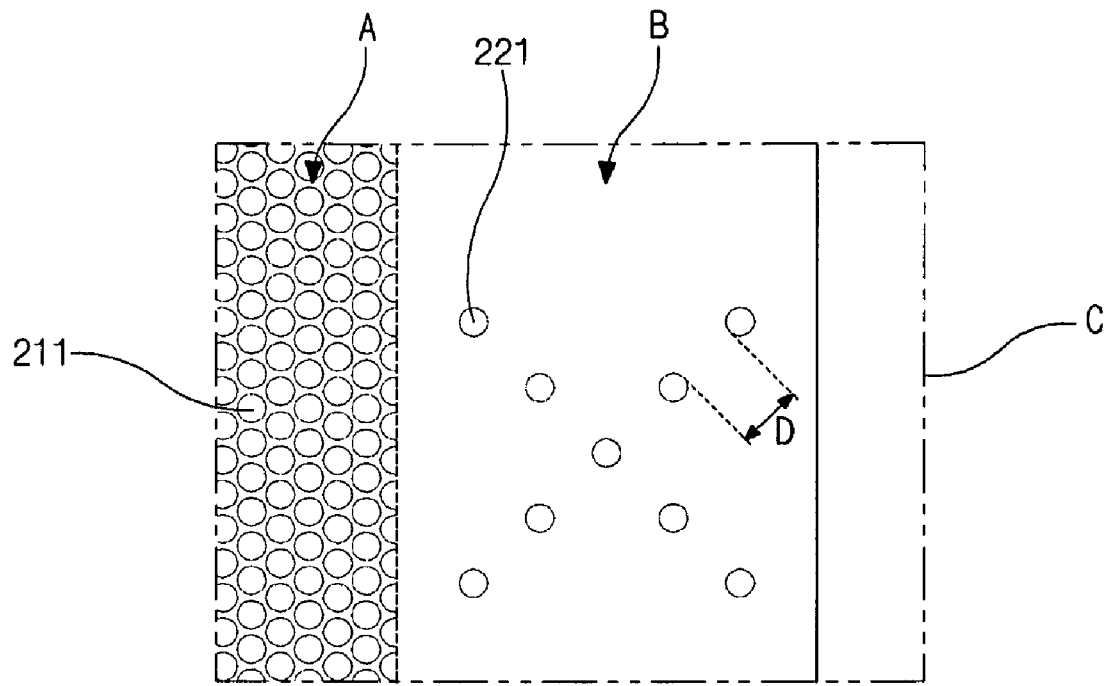
FIG. 5A is an enlarged view of region C from FIG. 4.
Figure 5B:
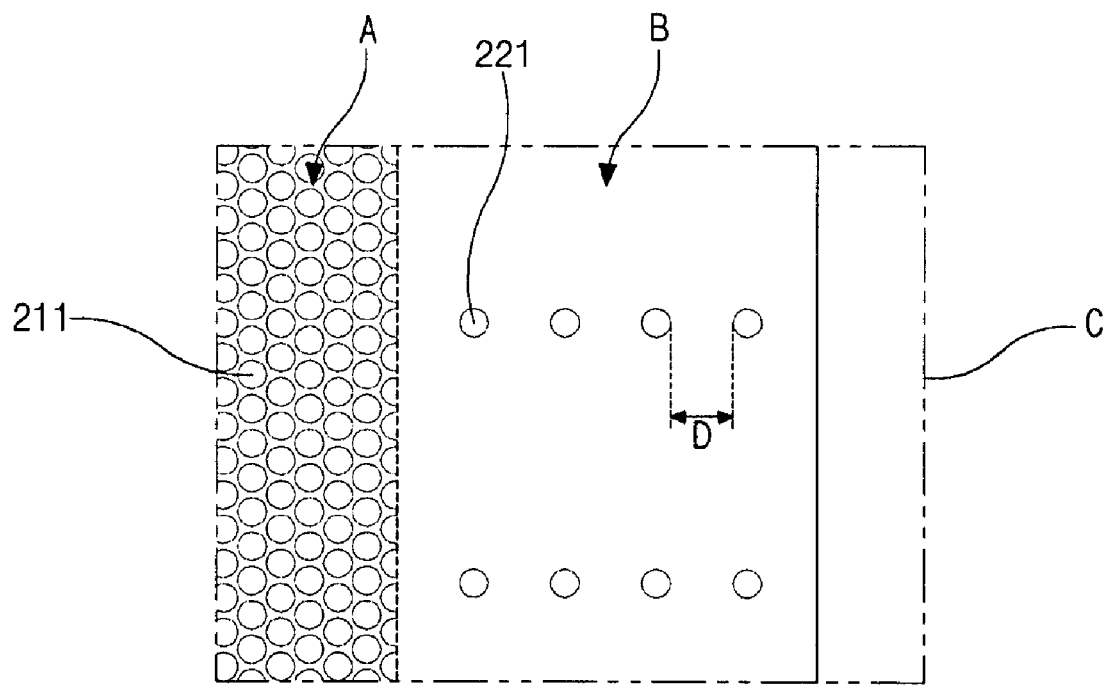
FIG. 5B shows an exemplary pattern of geometric features according to another embodiment of the invention.

FIG. 5A is an enlarged view of region C from FIG. 4 and FIG. 5B shows an exemplary pattern of geometric features according to another embodiment of the invention. Referring to FIGS. 5A and 5B, the second pattern of geometric features 221 in the second region B may have various arrangements as long as the second pattern of geometric features 221 does not substantially affect the dispersion of light as much as the first pattern of geometric features 211 in a first region A. In other words, the first region A may be a more effective region to disperse light and supply the light to the liquid crystal panel 210 (shown in FIG. 2) than the second region B. Accordingly, the second pattern of geometric features 221 may have a density less than a density of the first patterns 211, and have a distance D therebetween of several hundreds μm.

In embodiments of the invention, the first and second patterns of geometric features 211 and 221 may have other shapes. For example, one or both of the first and second patterns of geometric features may be a prism pattern or a lenticular pattern.

It will be apparent to those skilled in the art that various modifications and variations can be made in embodiments of the backlight unit and the liquid crystal display device including the backlight unit of the invention without departing from the spirit or scope of the invention. Thus, it is intended that the invention cover the modifications and variations of embodiments of this invention provided they come within the scope of the appended claims and their equivalents.

What is claimed is:

1. A backlight unit for a liquid crystal display panel, comprising:
   a lamp;
   a plurality of optical sheets;
   a light guide that guides light from the lamp toward the optical sheets, wherein the light guide includes a first region and a second region surrounding the first region at a peripheral portion; and
   a reflector facing a rear surface of the light guide, the light guide including:
      a first plurality of geometric shapes in the first region at the rear surface thereof that substantially directs the light incident on the light guide toward the optical sheets, and
      a second plurality of geometric shapes in the second region at the peripheral portion of the rear surface thereof to prevent the reflector from sticking to the light guide, wherein a density of the second plurality of geometric shapes in the second region is less than the density of the first plurality of geometric shapes in the second region.

2. The backlight unit of claim 1, wherein the geometric shapes in the second plurality are larger than or equal to the geometric shapes in the first plurality.

3. The backlight unit of claim 2, wherein a size of each of the geometric shapes in the first plurality and the second plurality is in a range of about 50 μm to about 200 μm.

4. The backlight unit of claim 1, wherein the density of the first plurality of geometric shapes increases with the distance from the lamp to the geometric shapes in the first plurality.

5. The backlight unit of claim 4, wherein a distance between adjacent ones of the geometric shapes in the first plurality is in a range of about 5 μm to about 140 μm.

6. The backlight unit of claim 1, wherein the distance between adjacent ones of the geometric shapes in the second plurality ranges from about 250 μm to about 900 μm.

7. The backlight unit of claim 1, wherein an area of the second plurality of geometric shapes is equal to or less than about 10% of the area of the peripheral portion of the rear surface of the light guide.

8. The backlight unit of claim 1, wherein a width of the peripheral portion is in a range of about 0.5 mm to 5 mm.

9. The backlight unit of claim 1, further comprising a lamp guide that supports the lamp at a side of the light guide and reflects light from the lamp toward the light guide.

10. A liquid crystal display device, including the backlight unit of claim 1, further comprising a liquid crystal display panel that displays images with the light from the optical sheets.

11. A backlight unit for a liquid crystal display panel, comprising:
   a lamp;
   a plurality of optical sheets;
   a light guide that guides light from the lamp toward a rear surface of the optical sheets, wherein the light guide includes a first region and a second region surrounding the first region at a peripheral portion; and
   a reflector facing a rear surface of the light guide, the light guide including:
      a first plurality of geometric shapes in the first region at the rear surface thereof that substantially directs the light incident on the light guide toward the optical sheets, and
      a second plurality of geometric shapes in the second region at the peripheral portion of the rear surface thereof, wherein an area of the second plurality of geometric shapes in the second region is equal to or less than about 10% of the area of the second region and wherein a density of the second plurality of geometric shapes in the second region is less than the density of the first plurality of geometric shapes in the second region.

12. The backlight unit of claim 11, wherein the geometric shapes in the second plurality are larger than or equal to the geometric shapes in the first plurality.

13. The backlight unit of claim 11, wherein the density of the first plurality of geometric shapes increases with the distance from the lamp to the geometric shapes in the first plurality.

14. A liquid crystal display device, including the backlight unit of claim 11, further comprising a liquid crystal display panel that displays images with the light from the optical sheets.

15. A method of controlling a propagation of light in a backlight unit for a liquid crystal display panel, the backlight unit having a lamp, a plurality of optical sheets, a light guide that guides light from the lamp toward the optical sheets wherein the light guide includes a first region and a second region surrounding the first region at a peripheral portion, and a reflector facing a rear surface of the light guide, the method comprising:
   providing a first plurality of geometric shapes in the first region at a rear surface of the light guide to substantially direct the light incident on the light guide toward the rear surface of the optical sheet; and
   providing a second plurality of geometric shapes in the second region at the peripheral portion of the rear surface of the light guide to prevent the reflector from sticking to the light guide, the geometric shapes in the second plurality larger than the geometric shapes in the first plurality, wherein a density of the second plurality of geometric shapes in the second region is less than the density of the first plurality of geometric shapes in the second region.

16. The method of claim 15, including changing a density of the first plurality of geometric shapes according to a distance from the lamp to the geometric shapes in the first plurality.

17. The method of claim 15, including increasing the density of the first plurality of geometric shapes with the distance from the lamp to the geometric shapes in the first plurality.

18. The method of claim 15, wherein an area of the second plurality of geometric shapes in the second region is equal to or less than about 10% of the area of the second region.

* * * * *